US012781901B2

(12) United States Patent
Park et al.

(10) Patent No.: US 12,781,901 B2
(45) Date of Patent: Nov. 3, 2026

(54) QUICK CONNECTOR HOSE

(71) Applicants: Hyundai Motor Company, Seoul (KR); Kia Corporation, Seoul (KR); NIFCO KOREA Inc., Asan-si (KR); DY AUTO Corporation, Asan-si (KR)

(72) Inventors: Jong Min Park, Hwaseong-si (KR); Young Joo Cho, Hwaseong-si (KR); Jae Hyoung Kim, Anyang-si (KR); Sin Won Kang, Anyang-si (KR); Jong Hyun Jin, Anyang-si (KR)

(73) Assignees: Hyundai Motor Company, Seoul (KR); Kia Corporation, Seoul (KR); NIFCO KOREA INC., Asan-si (KR); DY AUTO Corporation, Asian-si (KR)

( * ) Notice: Subject to any disclaimer, the term of this patent is extended or adjusted under 35 U.S.C. 154(b) by 0 days.

(21) Appl. No.: 19/259,732

(22) Filed: Jul. 3, 2025

(65) Prior Publication Data

US 2026/0132877 A1 May 14, 2026

(30) Foreign Application Priority Data

Nov. 14, 2024 (KR) ........................ 10-2024-0161987

(51) Int. Cl.
*F16L 37/40* (2006.01)
*F16L 37/14* (2006.01)
*F16L 37/42* (2006.01)

(52) U.S. Cl.
CPC ............. *F16L 37/40* (2013.01); *F16L 37/144* (2013.01); *F16L 37/42* (2013.01)

(58) Field of Classification Search
CPC ......... F16L 37/40; F16L 37/144; F16L 37/42; F16L 37/35; F16L 37/38; F16L 29/02; F16L 29/04; F16L 37/0841; F16L 37/0885; F16K 27/0236; F16K 27/0209; F16K 17/0453
See application file for complete search history.

(56) References Cited

U.S. PATENT DOCUMENTS

| | | | | | |
|---|---|---|---|---|---|
| 2,024,682 | A | * | 12/1935 | Eisenman | F16L 37/42 |
| 2,099,335 | A | * | 11/1937 | Hansen | F16L 37/42 |
| 2,344,739 | A | * | 3/1944 | Shaff | F16L 37/42 |
| 2,412,685 | A | * | 12/1946 | Oldham | F16L 37/42 |
| 2,433,119 | A | * | 12/1947 | Hansen | F16L 37/42 |
| 2,777,716 | A | * | 1/1957 | Gray | F16L 37/42 |

(Continued)

FOREIGN PATENT DOCUMENTS

KR 2024-0000920 A 1/2024

*Primary Examiner* — William S. Choi
(74) *Attorney, Agent, or Firm* — Fish & Richardson P.C.

(57) ABSTRACT

A quick connector hose assembly includes a body having one end connected to a hose, a connector fluidly connected to the hose and located in the body, a valve coupled to the connector, a communication hole located between the valve and the connector, and a housing coupled to the valve and the connector, wherein the valve includes a flange in contact with a plane of the connector and an elastic part extending from the flange in a longitudinal direction of the connector, the elastic part surrounds and seals a chamber formed between the communication hole and the elastic part, and an end of the elastic part expands from the flange depending on a flow of fluid so as to selectively open and close the chamber.

15 Claims, 3 Drawing Sheets

(56) References Cited

U.S. PATENT DOCUMENTS

| | | | | |
|---|---|---|---|---|
| 5,074,524 | A * | 12/1991 | Wade | F16L 37/42 |
| 5,294,092 | A * | 3/1994 | Wade | F16L 37/42 |
| 5,806,832 | A * | 9/1998 | Larbuisson | F16L 37/42 |
| 10,247,343 | B2 * | 4/2019 | Dörnhöfer | F16L 37/0885 |
| 2006/0278280 | A1 * | 12/2006 | Yang | F16K 27/0209 |
| 2024/0151338 | A1 * | 5/2024 | Desai | |

* cited by examiner

QUICK CONNECTOR HOSE

CROSS-REFERENCE TO RELATED APPLICATION

This application claims, under 35 U.S.C. § 119(a), the benefit of priority from Korean Patent Application No. 10-2024-0161987, filed on Nov. 14, 2024, the entire contents of which are incorporated herein by reference.

TECHNICAL FIELD

The present disclosure relates to a technique of preventing backflow of fluid and controlling a flow of fluid in a vehicle fluid system, and more particularly to, a system configured to install a check valve in a plastic hose and a quick connector assembly, thereby preventing backflow of fluid and performing efficient fluid injection. The present technique is applicable to various vehicle fluid delivery systems requiring flow control of fluid and pressure regulation thereof.

BACKGROUND

A vehicle fluid system such as a washing fluid delivery system may provide visibility of a vehicle.

In some cases, a vehicle fluid delivery system may deliver washing fluid through a rubber hose or a plastic hose. The rubber hose is flexible but is vulnerable to high pressure. The plastic hose may be stronger than the rubber hose but may operate with a separate quick connector. The quick connector may easily couple a hose to a counterpart, thereby increasing efficiency of a vehicle assembly process.

In some cases, a quick connector may be simply used to couple a hose to a counterpart. The quick connector may not include a functional component such as a check valve, where washing fluid may flow backward from a pump to a nozzle. Particularly, when the nozzle is located at the upper end of a vehicle, washing fluid is more likely to flow backward due to gravity, which may cause a time delay when a user sprays washing fluid through the nozzle. In addition, when washing fluid flows backward, the washing fluid replenishment cycle of the vehicle may be shortened, resulting in an increase in maintenance costs.

SUMMARY

The present disclosure describes a device capable of preventing backflow of washing fluid and shortening a washing fluid injection time by installing an expandable elastic body check valve in a quick connector.

The present disclosure describes a device to reduce washing fluid loss occurring in a washing fluid delivery system of a vehicle and to improve assembly performance.

The present disclosure describes a technique of installing a quick connector and a check valve in a hose configured to deliver washing fluid of a vehicle, thereby making it possible not only to provide efficient delivery of washing fluid, but also to prevent backflow of washing fluid. Through this structural configuration, the backflow of washing fluid is prevented, and loss of washing fluid is reduced. In this manner, convenience of vehicle maintenance can be improved.

The present disclosure describes a technique capable of preventing backflow of washing fluid and shortening a washing fluid injection time by installing an expandable elastic body check valve in a quick connector.

According to one aspect of the subject matter described in this application, a quick connector hose assembly includes a hose, a body having a first end connected to the hose, a connector located in the body and fluidly connected to the hose, a valve coupled to the connector, where a communication hole is defined between the valve and the connector, and a housing coupled to the valve and the connector. The valve includes a flange in contact with the connector and an elastic part that extends from the flange in a longitudinal direction of the connector, where the elastic part is configured to surround and cover a chamber that is defined between the communication hole and the elastic part. An end of the elastic part is configured to detach from and attach to the connector based on a flow of fluid through the hose to thereby selectively open and close the communication hole.

Implementations according to this aspect can include one or more of the following features. For example, the housing can include a stepped part in contact with at least a part of the flange, and an extension part disposed adjacent to the stepped part and coupled to the connector. In some examples, the communication hole can be defined at an outer surface of the connector and faces an inner surface of the elastic part. In some examples, the end of the elastic part can be configured to, based on the fluid being introduced toward the communication hole, move toward the housing relative to the flange to thereby open the communication hole.

In some examples, the elastic part is configured to move relative to the flange in a direction perpendicular to a longitudinal axis of the connector, where a volume of the chamber is configured to vary based on movement of the end of the elastic part in the direction perpendicular to the longitudinal axis of the connector.

In some implementations, the housing can include a first portion in contact with the body, a second portion located at an end of the housing, a seating portion located between the first portion and the second portion, and a holder coupled to the seating portion, where the seating portion defines a plurality of coupling holes at a lower end thereof, the plurality of coupling holes being configured to receive at least a part of the holder. In some examples, the holder can include a first locking part that surrounds an upper end of the seating portion and a plurality of second locking parts that extend from the first locking part along inner surfaces of the first portion and the second portion, where the plurality of second locking parts are configured to respectively insert into the plurality of coupling holes.

In some implementations, the housing can further include an unlocking guide located adjacent to the plurality of coupling holes, where the plurality of second locking parts are configured to move along the unlocking guide. In some examples, the first locking part can be configured to, based on external force being applied to the first locking part, move toward the seating portion, and the plurality of second locking parts can be configured to, based on the first locking part moving toward the seating portion, move along the unlocking guide to thereby be unlocked from the housing.

In some implementations, the quick connector hose assembly can further include a nipple inserted into the housing, the nipple having an inclined surface having an outer diameter increasing in a direction away from the housing. The nipple is inserted into the housing and configured to cause the plurality of second locking parts to move away from each other toward opposite ends of the housing along the inclined surface.

In some examples, the connector can define the communication hole at an outer circumferential surface thereof, where the chamber extends from an inside of the connector to the communication hole.

In the present application, the terms "vehicle", "vehicular", and other similar terms as used herein are inclusive of motor vehicles in general, such as passenger automobiles including sport utility vehicles (SUVs), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

BRIEF DESCRIPTION OF THE DRAWINGS

The above and other features of the present disclosure will now be described in detail with reference to example implementations thereof illustrated in the accompanying drawings which are given hereinbelow by way of illustration only, and thus are not limitative of the present disclosure.

Figure 1:
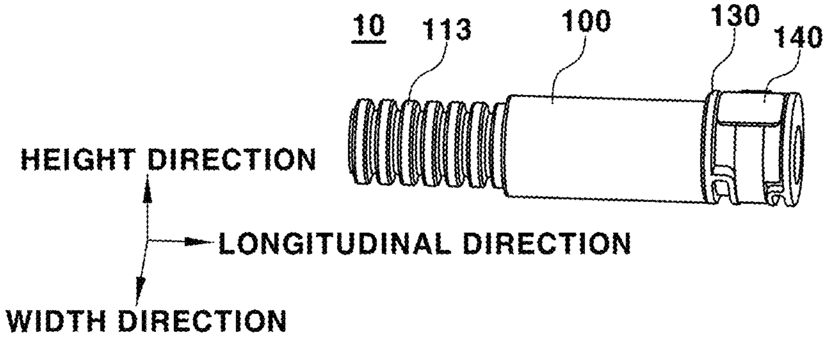
FIG. 1 is a perspective view showing an example of a quick connector hose assembly.

In the figures, reference numbers refer to the same or equivalent parts of the present disclosure throughout the several figures of the drawing.

DETAILED DESCRIPTION

Hereinafter, reference will be made in detail to various implementations of the present disclosure, examples of which are illustrated in the accompanying drawings and described below.

In the specification below, a forward direction refers to a direction in which a housing 130 is inserted into a body 100, and a rearward direction refers to a direction in which the housing 130 is separated from the body 100.

Hereinafter, implementations will be described in detail with reference to the accompanying drawings. In describing the implementations with reference to the accompanying drawings, the same or corresponding components will be denoted by the same reference numerals and redundant description thereof will be omitted.

FIG. 1 is a perspective view showing an example of a quick connector hose assembly 10.

In some implementations, the quick connector hose assembly 10 is formed of a body 100 connected to a hose 113, a connector 110 inserted into the body 100 and connected to the hose 113, a valve 120 coupled to the connector 110, and a housing 130 configured to contact at least a part of the valve 120 and coupled to the connector 110.

A part of the hose 113 is inserted into one end of the body 100. The hose 113 can be used in a fluid delivery system of a vehicle. Further, the hose can be formed to have a cylindrical shape and a convoluted shape extending in the longitudinal direction thereof.

The convoluted shape increases flexibility of the hose 113 such that the hose is readily used in a complex piping structure inside the vehicle and enables a constant flow of fluid even if the hose 113 is bent or pressed.

In some examples, the hose 113 can be made of poly vinyl chloride (PVC) or thermoplastic poly urethane (TPU). The hose 113 made of PVC can have durability and chemical resistance higher than chemical resistance of the hose 113 made of other materials. Additionally, wear resistance of the hose 113 made of TPU with respect to low and high temperatures is higher than that of the hose 113 made of other materials.

The body 100 fluidly connected to the hose 113 and configured to allow fluid from the hose 113 to be introduced thereinto can be formed to have a cylindrical shape extending in the longitudinal direction thereof. Furthermore, the body 100 has a front end into which the hose 113 is inserted. Here, an inner diameter of the front end of the body 100 can be manufactured to be the same as an outer diameter of the hose 113 such that the hose 113 is inserted into the body 100 or can be manufactured to be larger than the outer diameter of the hose 113. That is, the inner diameter of the front end of the body 100 can be determined corresponding to the outer diameter of the hose 113.

In some implementations, when the hose 113 has a convoluted shape, the portion of the body 100 receiving the hose 113 can be formed with a ribbed shape to ensure secure coupling. The ribbed shape can allow the hose 113 and the body 100 to be firmly coupled to each other, can prevent separation therebetween which can occur when fluid flows through the hose, and can maintain airtightness between the hose and the body.

The connector 110 inserted into the body 100 is configured to include at least two coupling parts 114 extending along the outer circumferential surface of the connector 110 in the longitudinal center of the body 100 and the vertical direction thereof, and a screw groove 116 formed between the coupling parts 114.

In some examples, the connector 110 can be fixedly screwed to the body 100. The connector 110 can be fixed to the body 100 through engagement between the screw groove 116 and a screw thread 101 formed in the inner circumferential surface of the body 100. In addition, a protrusion 117 protruding from the outer circumferential surface of the connector 110 is formed in the screw groove 116.

When the connector 110 is rotatably inserted into the body 100, the screw groove 116 is rotated along the screw thread 101. When the screw thread 101 contacts the protrusion 117 due to continued rotation of the screw groove 116, rotation of the connector 110 is stopped and the connector 110 is fixed to the body 100.

In some examples, the front end of the connector 110 can be fluidly connected to the hose 113 located inside the body 100. Furthermore, a communication hole 111 is located at the rear end of the connector 110. In some implementations, the communication hole 111 is located in the outer circumferential surface of the rear end of the connector 110.

Fluid introduced through the hose 113 can flow into the housing 130 via the communication hole 111.

The valve 120 located facing the communication hole 111 is coupled to the connector 110. The valve 120 can be formed of a flange 121 in contact with the plane of the connector 110 and an elastic part 122 extending in the longitudinal direction thereof from the flange 121. In addition, the elastic part 122 can be formed of an elastic body having elastic restoring force.

The elastic part 122 is configured to surround the communication hole 111 and to selectively open and close the communication hole 111 through expansion and restoration of the elastic part 122. Furthermore, the elastic part 122 is configured to selectively seal a chamber 112 formed between the communication hole 111 and the elastic part 122 and fluidly connected to the communication hole 111.

In some implementations, the elastic part 122 can expand from the flange 121 in response to pressure of fluid introduced into the hose 113. When an inner surface of the elastic part 122, the inner surface facing the chamber 112, is subjected to pressure from the introduced fluid in a direction in which the elastic part 122 is moved away from the connector 110, the rear end of the elastic part 122, which is far from the flange 121, can expand radially with respect to the longitudinal center of the body 100. In this case, the chamber 112 can be opened with respect to the elastic part 122, and the volume of the chamber 112 can vary depending on expansion of the rear end of the elastic part 122.

Specifically, as the rear end of the elastic part 122 expands, the distance from the inner surface of the elastic part 122 to the outer circumferential surface of the connector 110, where the communication hole 111 is located, increases. Here, the distance can refer to a straight distance from the longitudinal center of the body 100 to the inner circumferential surface of the body 100.

Accordingly, since the distance from the elastic part 122 to the outer circumferential surface of the connector 110 including the communication hole 111 increases, the volume of the chamber 112 formed between the elastic part 122 and the communication hole 111 can increase.

Through this structural configuration, fluid introduced into the hose 113 lifts the inner surface of the elastic part 122, and the introduced fluid can flow into the housing 130 along the outer surface of the rear end of the connector 110.

In some examples, when no fluid is introduced into the inner surface of the elastic part 122 through the communication hole 111, the elastic part 122 comes into contact with the connector 110 by elastic restoring force. In addition, in a state in which pressure from fluid is applied to the inner surface of the elastic part 122 in a direction in which the elastic part 122 is moved away from the connector 110, when the pressure is smaller than elastic restoring force of the elastic part 122, the elastic part 122 comes into contact with the connector 110 by the elastic restoring force and seals the chamber 112.

Therefore, when the rear end of the elastic part 122 expands, a distance between the inner surface of the elastic part 122 and the upper end of the communication hole 111 increases, and when the rear end of the elastic part 122 is returned to the original position thereof, the distance therebetween decreases. When a vertical distance between the inner surface of the elastic part 122 and the upper end of the communication hole 111 decreases, the volume of the chamber 112 can decrease.

In some examples, even if fluid flows from the rear end of the housing 130 to the front end thereof, the elastic part 122 is in close contact with the connector 110 such that fluid does not open the elastic part 122. As a result, since the chamber is closed, fluid may not flow from the rear end of the housing to the front end thereof.

In some examples, the valve 120 of the elastic body of the present disclosure functions as a check valve 120 configured to allow fluid introduced through the hose 113 to flow only in one direction from the front end of the inner side of the connector 110 and the housing 130 to the rear end thereof, thereby preventing backflow of fluid.

The housing 130 configured to surround the valve 120 including the elastic part 122 and coupled to the connector 110 is formed to have a stepped part 131 in contact with at least a part of the plane of the flange 121. Furthermore, the housing 130 is formed to have an extension part 132 extending from the upper end of the stepped part 131 in a direction in which the stepped part 131 faces the connector 110. In addition, the extension part 132 comes into contact with the coupling parts 114 of the connector 110.

The rear end of the flange 121 comes into contact with the stepped part 131, and the outer circumferential surface of the flange 121 comes into contact with the extension part 132. Furthermore, a locking jaw 115 located on the outer circumferential surface of the connector 110 and coupled to the coupling part 114 can contact the plane of the front end of the flange 121.

In some examples, the flange 121 can be forcibly fitted between the stepped part 131, the extension part 132, and the locking jaw 115. That is, the flange 121 can be formed to have a coupling structure corresponding to longitudinal flow force of fluid introduced into the hose 113 through the stepped part 131, the extension part 132, and the locking jaw 115. Therefore, the flange 121 can be fixed to the connector 110 and the housing 130 through the above-mentioned coupling structure even if fluid flow force is applied to the flange.

The housing 130 that is selectively fluidly connected to the chamber 112 by expansion and restoration of the elastic part 122 can be formed of a first portion 134 in contact with the plane of the body 100 and a second portion 135 located at the rear end of the housing 130. Furthermore, the housing 130 is configured to include a seating portion 136 connecting the first portion 134 to the second portion 135. The seating portion 136 can have a holder 140 seated thereon, and the holder 140 is configured to allow a nipple 150 inserted into the housing 130 to be attached thereto or detached therefrom. Furthermore, at least one seating portion 136 can be located on both sides of the upper end between the first portion 134 and the second portion 135.

In some examples, coupling holes 139 can be defined at the lower end of the seating portion 136, and at least a part of the holder 140 is inserted into the coupling holes 139. That is, the housing 130 can be formed of the first portion 134, the second portion 135, the seating portion 136, and the coupling holes 139.

The holder 140 located between the first portion 134 and the second portion 135 is formed of a first locking part 141 configured to surround the upper end of the seating portion 136, and second locking parts 142 extending from the first locking part 141 along the respective inner surfaces of the first portion 134 and the second portion 135. Furthermore, the first locking part 141 can be compressed or restored by external force. When the nipple 150 is inserted into the housing 130, the second locking parts 142 can be spaced apart from each other in a direction away from the inside of the housing 130 along an inclined surface 151 of the nipple 150 or can approach each other in a direction toward the inside of the housing 130. To this end, each of the first locking part 141 and the second locking parts 142 can be formed of an elastic body.

In addition, the second locking parts 142 can be respectively inserted into the coupling holes 139 and can be located facing the respective lower ends of the seating portion 136. Furthermore, the second locking parts 142 can be moved integrally with the first locking part 141. For example, when external force is applied to move the first locking part 141 to the lower end of the housing 130, the first locking part 141 and the second locking parts 142 can be integrally moved downwards along the inner surfaces of the first portion 134 and the second portion 135.

Additionally, when the second locking parts 142 are moved downwards toward the lower end of the housing 130 between the first portion 134 and the second portion 135, the second locking parts 142 can be respectively moved along the opposite outer surfaces of an unlocking guide 137 that is adjacent to the coupling holes 139 and is located at the lower end of the housing 130.

Figure 2:
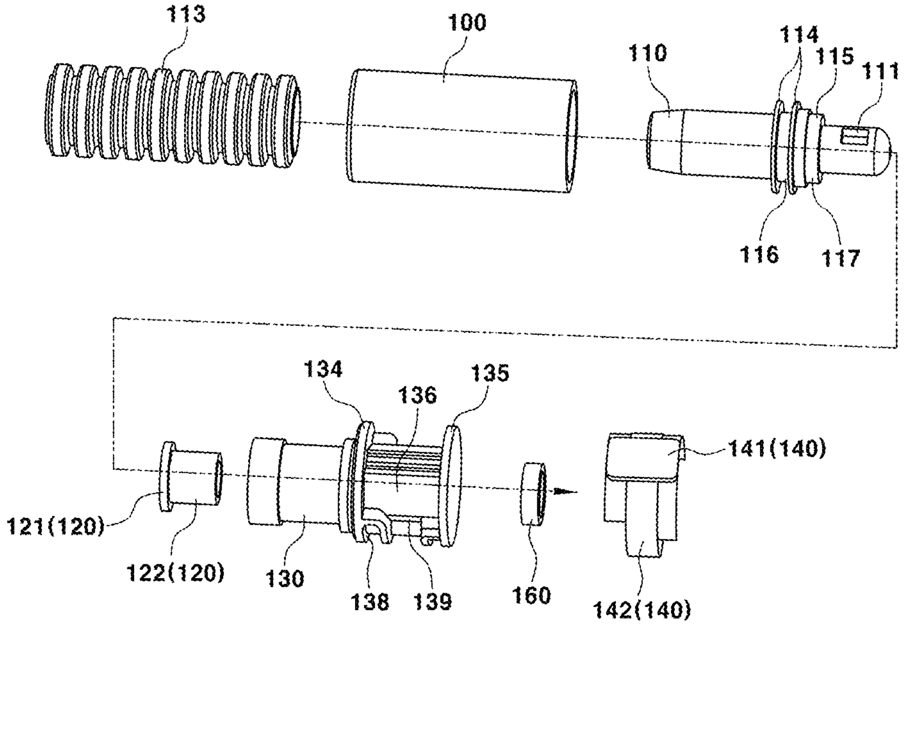
FIG. 2 is an exploded view of the quick connector hose assembly.

FIG. 2 is an exploded view of the quick connector hose assembly 10.

In some implementations, each component of the quick connector hose assembly 10 is designed to control the flow of fluid and maintain airtightness of the connector hose.

The elastic part 122 is formed to extend from the flange 121 and is expanded or restored depending on the flow of fluid. The elastic part 122 expands to open the chamber 112 according to fluid flow force. Here, when fluid does not pass through the quick connector hose, the elastic part 122 is returned to the original position thereof so as to seal the chamber 112. Furthermore, the elastic part 122 can be made of a material such as silicone, ethylene propylene diene monomer (EPDM), or thermoplastic poly urethane (TPU).

Additionally, the elastic part 122 expands radially from the longitudinal center of the body 100 by fluid pressure and controls the flow of fluid through a volume change of the chamber 112. For example, the elastic part 122 can expand from the front end of the elastic part 122 connected to the flange 121 in a direction in which the tip of the elastic part 122, that is, the rear end of the elastic part 122 is adjacent to the inner surface of the housing 130. In this case, the elastic part 122 can be formed to have a conical shape or a trumpet shape.

In addition, the elastic part 122 can maintain a smooth flow of fluid in a state of being expanded, and can seal the chamber 112 in a state of being returned to the original position thereof so as to secure airtightness within the fluid delivery system. In some implementations, the inner surface of the elastic part 122 can contact the surface of the connector 110, or the rear end of the elastic part 122 can contact the surface of the connector 110 such that the elastic part 122 seals the chamber 112.

The rear end of the flange 121 contacts the plane of the stepped part 131 and is coupled to the stepped part 131. Through such a coupling structure, it is possible to offset flow force generated by fluid. Specifically, fluid introduced into the hose 113 moves in the longitudinal direction from the front end of the connector 110 to the rear end thereof and collides with the connector 110. Due to the collision, the connector 110 is subjected to external force in a direction away from the body 100 (hereinafter collectively referred to as a rearward direction).

Since the locking jaw 115 of the connector 110 is coupled to the flange 121 in a state in which the plane of the locking jaw 115 and the plane of the flange 121 contact each other, external force applied to the connector 110 in the rearward direction is transferred to the flange 121. The flange 121 transfers this external force in the rearward direction to the stepped part 131, the stepped part 131 generates resistance force as reaction force in response to the external force, and the resistance force is transferred to the flange 121.

In some examples, the resistance force acting on the flange 121 has the same magnitude as the external force, but acts in the opposite direction so as to offset the external force applied to the flange 121. Through this offset action, the flange 121 can be fixed without being pushed or moved by external force.

Therefore, resistance force generated in the stepped part 131 in response to longitudinal flow force of fluid introduced into the hose 113 can be transferred to the flange 121, and the resistance force transferred to the flange 121 can be offset by external force caused by the flow of fluid.

In some examples, the flange 121 can be subjected to not only external force by the connector 110 but also external force caused by expansion of the elastic part 122. When fluid that has collided with the connector 110 passes through the communication hole 111 and collides with the elastic part 122, the inner surface of the elastic part 122 is subjected to pressure in a direction in which the elastic part 122 is moved away from the connector 110.

Through this structural configuration, the elastic part 122 expands in the direction toward the housing 130. When the elastic part 122 expands, the flange 121 connected to the elastic part 122 receives external force in a forward direction. Here, the forward direction can refer to a direction in which the housing 130 is inserted into the body 100.

Here, external force in the forward direction is transferred to the locking jaw 115, the locking jaw 115 generates resistance force due to action and reaction, and the resistance force is applied to the flange 121.

In the flange 121, external force in the forward direction and resistance force in the rearward direction can be offset, and various external forces applied to the flange 121 can be distributed by the locking jaw 115, the extension part 132, and the stepped part 131. Therefore, the flange 121 can be fixed between the stepped part 131, the locking jaw 115, and the extension part 132 through a coupling structure thereof while resisting fluid flow force.

Fluid introduced into the hose 113 passes through the elastic part 122 and flows into the housing 130. Moreover, the inside of the housing 130 can be fluidly connected to the inside of the nipple 150 inserted into the housing 130, and fluid can be discharged to the outside. When the fluid flowing through the inside of the housing 130 flows to the nipple 150, an O-ring 160 located between the housing 130 and the front end of the nipple 150 prevents the fluid from leaking along the outer surface of the front end of the nipple 150. In some implementations, the O-ring 160 is configured to surround the front end of the nipple 150 and to seal a space formed between the housing 130 and the nipple 150. Furthermore, the O-ring 160 can be inserted into the first portion 134.

Figure 3A:
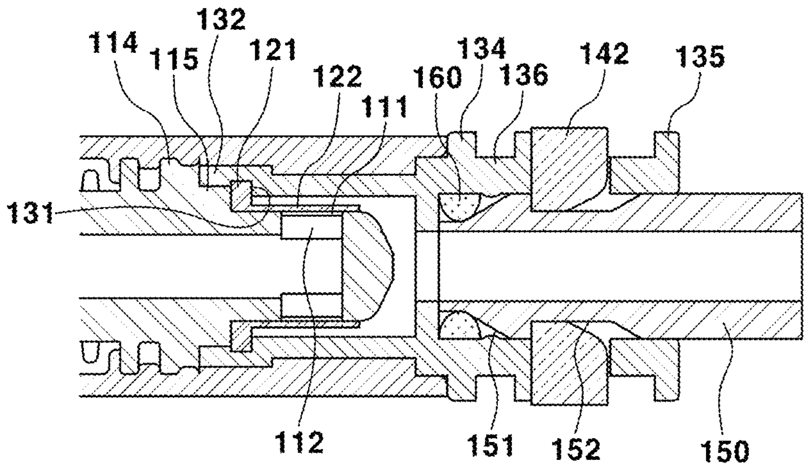
FIG. 3A is a cross-sectional view of the quick connector hose assembly when a valve closes a communication hole.
Figure 3B:
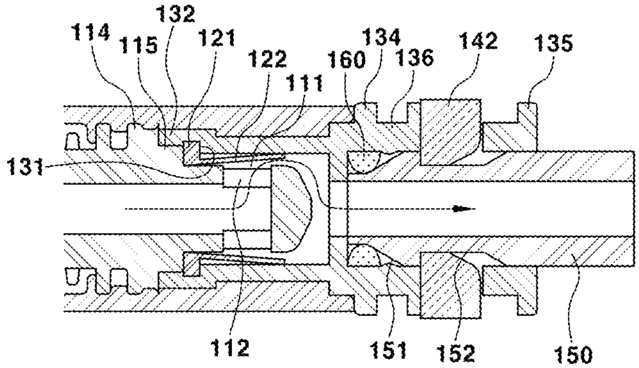
FIG. 3B is a cross-sectional view of the quick connector hose when the valve opens the communication hole.

FIG. 3A is a diagram showing a state before expansion of the elastic part 122, and FIG. 3B is a diagram showing a state after expansion of the elastic part 122.

In some implementations, fluid introduced into the hose 113 flows to the communication hole 111 through the connector 110 and moves in the longitudinal direction from the front end of the connector 110 to the rear end thereof.

In some implementations, a flow control disc is disposed at the inlet of the communication hole 111 to perform a function of controlling a flow rate of fluid when the fluid flows into the housing 130 through the communication hole 111.

In some implementations, the flow control disc is installed on a path through which fluid passes through the connector 110 and flows into the communication hole 111. The flow control disc includes a flow hole designed to regulate both the flow velocity and the flow rate of fluid as it passes through. The size and shape of the flow hole control an inflow rate of fluid, thereby preventing pressure fluctuation in the fluid delivery system that can occur due to excessive flow rate.

Specifically, the flow control disc can control the flow of fluid in such a manner that the flow rate increases as the cross-sectional area of the flow hole decreases, and the flow rate decreases as the cross-sectional area increases. In addition, a constant flow rate can be maintained when fluid passes through the communication hole 111 and flows to the elastic part 122, thereby preventing abrupt fluctuation in the flow of fluid and maintaining stability of the fluid delivery system.

Furthermore, fluid passing through the flow control disc faces the inner surface of the elastic part 122.

When pressure from the fluid is applied to the inner surface of the elastic part 122 in a direction pushing it away from the connector 110, and this pressure exceeds the restoring force of the elastic part 122, the elastic part 122 expands radially toward the inner surface of the housing 130. When the elastic part 122 is adjacent to the inner surface of the housing 130, the chamber 112 is opened such that the fluid can flow through the communication hole 111 fluidly connected to the chamber 112. Therefore, the fluid passing through the communication hole 111 can flow into the inner surface of the housing 130 through the chamber 112. The fluid flowing into the inner surface of the housing 130 flows into the nipple 150 inserted into the housing 130 and is discharged to the outside.

In some implementations, a protection ring of the elastic part 122 can be mounted on the outer circumferential surface of the rear end of the elastic part 122. When the elastic part 122 expands in a direction toward the inner surface of the housing 130, the protection ring of the elastic part 122 can perform a function of preventing direct contact with the inner surface of the housing 130 and ensuring durability of the elastic part 122.

In some examples, when fluid flow force becomes smaller than elastic restoring force, the elastic part 122 is returned to the original position thereof. That is, the elastic part 122 is moved in a direction of sealing the chamber 112. In this case, the chamber 112 is closed such that the flow of fluid flowing into the housing 130 is blocked.

In some examples, the quick connector hose assembly 10 of the present disclosure has a technical feature of controlling fluid such that the fluid flows only in one direction through radial expansion and restoration of the elastic part 122.

Figure 4A:
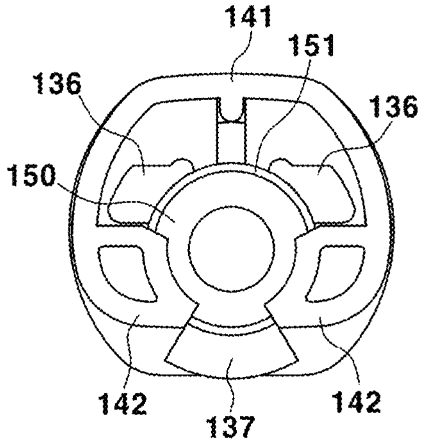
FIG. 4A is a view showing an example of a holder that is coupled to a nipple inserted into a housing.
Figure 4B:
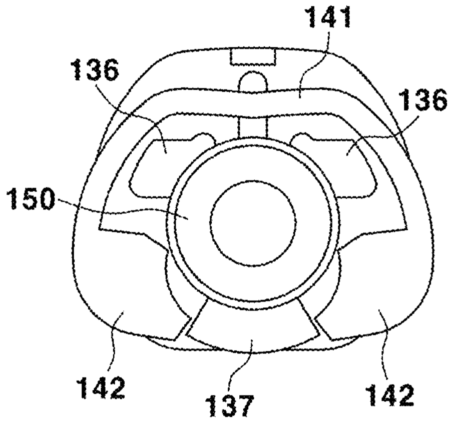
FIG. 4B is a view showing the holder that is unlocked from the housing.

FIG. 4A is a diagram showing a state in which the holder 140 is coupled to the nipple 150 inserted into the housing 130, and FIG. 4B is a diagram showing a state in which the holder 140 is unlocked from the housing 130.

In some implementations, the housing 130 can be configured to include a fixing guide 138 located on the inner surface of each of the first portion 134 and the second portion 135 and formed to extend downwards along the inner surface of each of the first portion 134 and the second portion 135.

The holder 140 located between the first portion 134 and the second portion 135 can be located to surround the upper end of the seating portion 136. Furthermore, the second locking parts 142 of the holder 140 are respectively inserted into the coupling holes 139 and located facing the lower end of the seating portion 136. In some implementations, the second locking parts 142 can be located between the respective fixing guides 138. Therefore, the second locking parts 142 can be moved along the inner surfaces of the fixing guides 138 between the fixing guides 138.

In some examples, the second locking parts 142 can be moved along the inclined surface 151 of the nipple 150 inserted into the housing 130. The nipple 150 includes the inclined surface 151, the outer diameter of which increases in a direction in which the nipple 150 is separated from the housing 130. When the nipple 150 is inserted into the housing 130, the second locking parts 142 face the inclined surface 151.

When the nipple 150 is inserted into the housing, the second locking parts 142 are spaced apart from each other in a direction in which the second locking parts 142 are respectively moved away from both ends of the housing 130 along the inclined surface 151. When the nipple 150 is inserted into the housing such that the second locking parts 142 are separated from the inclined surface 151, the second locking parts 142 face a cylindrical part 152 having a step relative to the inclined surface 151. In some implementations, the step is a vertical distance from the outer circumferential surface of the cylindrical part 152 to the rear end of the inclined surface 151 in the height direction. Furthermore, the outer diameter of the rear end of the inclined surface 151 is larger than the outer diameter of the cylindrical part 152.

Therefore, when the second locking parts 142 are moved along the inclined surface 151 and pass through the rear end of the inclined surface 151 to face the cylindrical part 152, the second locking parts 142 are moved toward the inside of the housing 130. Since the second locking parts 142 are moved toward the inside of the housing 130 and come into contact with the cylindrical part 152 of the nipple 150, the nipple 150 can be fixed to the housing 130.

That is, when the nipple 150 is first inserted into the housing, the second locking parts 142 are moved along the inclined surface 151 in a direction away from both ends of the housing 130. When the nipple 150 is completely inserted into the housing 130, the second locking parts 142 are moved toward the inside of the housing 130, and the housing 130 and the nipple 150 are coupled to each other.

When the nipple 150 is separated from the quick connector hose assembly 10, a user can apply force to the first locking part 141 from the upper end of the housing 130 to the lower end thereof. In this case, external force directed toward the inside of the housing 130 is applied to the first locking part 141, and the first locking part 141 is moved downwards in the height direction along the inner surfaces of the first portion 134 and the second portion 135.

The second locking parts 142 connected to the first locking part 141 are moved integrally with the first locking part 141. Furthermore, the second locking parts 142 are moved downwards in the height direction toward the lower end of the housing 130 between the fixing guides 138. At the same time, the second locking parts 142 are moved in the left-and-right width direction of the housing 130 along the outer surface of the unlocking guide 137 in a direction away from both ends of the housing 130.

In some examples, when the second locking parts 142 are moved away from both ends of the housing 130 such that cross sections of the second locking parts 142 that come into contact with the cylindrical part 152 of the nipple 150 are separated from the cylindrical part 152 of the nipple 150, coupling between the nipple 150 and the housing 130 is released. Therefore, the nipple 150 can be easily separated from the housing 130.

The quick connector hose assembly 10 of the present disclosure is an integral quick connector hose assembly 10 including the valve 120 capable of controlling the flow of fluid in only one direction. In the quick connector hose assembly 10, the elastic part 122 located in the longitudinal direction expands from the flange 121 in the radial direction due to fluid flow force, and fluid introduced through the hose 113 can flow into the housing 130. In addition, the quick connector hose assembly 10 has a technical feature of firmly fixing the nipple 150 to the housing 130 through a locking-and-unlocking mechanism of the holder 140.

As is apparent from the above description, the present disclosure can achieve the following effects by the configuration, combination, and use relationship described in the implementations.

In some implementations, an expandable elastic check valve is installed in a quick connector hose so as to prevent washing fluid from flowing backward, and the washing fluid is stably delivered from a pump to a nozzle, thereby having an effect of shortening injection time of the washing fluid.

In some implementations, since the check valve is formed to be integrated with the quick connector hose assembly, additional parts may not be included in the hose assembly, such that an assembly process is simplified, thereby having an effect of reducing manufacturing costs and assembly time.

In some implementations, in the case of a nozzle located on the upper end of a vehicle, it is possible to prevent washing fluid from flowing backward due to gravity and to reduce the loss of washing fluid, thereby having an effect of improving reliability and efficiency of a fluid delivery system.

The present disclosure has been described in detail with reference to example implementations thereof, and the present disclosure can be used in various other combinations, modifications, and environments. That is, it will be appreciated by those skilled in the art that changes can be made in these implementations without departing from the principles and spirit of the disclosure, the scope of which is defined in the appended claims and equivalents thereto. The implementations describe the examples to implement the technical idea of the present disclosure, and various changes in specific application fields and uses of the present disclosure are also possible. Accordingly, the detailed description of the present disclosure is not intended to limit the present disclosure to the disclosed implementations. Additionally, the scope of the appended claims should be construed as including other implementations as well.

What is claimed is:

1. A quick connector hose assembly comprising:
- a hose;
- a body having a first end connected to the hose;
- a connector located in the body and fluidly connected to the hose;
- a valve coupled to the connector, wherein a communication hole is defined between the valve and the connector; and
- a housing coupled to the valve and the connector, wherein the valve comprises:
- a flange in contact with the connector, and
- an elastic part that extends from the flange in a longitudinal direction of the connector, the elastic part being configured to surround and cover a chamber that is defined between the communication hole and the elastic part, and wherein an end of the elastic part is configured to radially deform to detach from and attach to the connector based on pressure of a flow of fluid through the hose being applied to an inner surface of the elastic part to thereby selectively open and close the communication hole.

2. The quick connector hose assembly of claim 1, wherein the housing comprises:
- a stepped part in contact with at least a part of the flange; and
- an extension part disposed adjacent to the stepped part and coupled to the connector.

3. The quick connector hose assembly of claim 1, wherein the communication hole is defined at an outer surface of the connector and faces an inner surface of the elastic part.

4. The quick connector hose assembly of claim 3, wherein the end of the elastic part is configured to, based on the fluid being introduced toward the communication hole, move toward the housing relative to the flange to thereby open the communication hole.

5. The quick connector hose assembly of claim 4, wherein the elastic part is configured to move relative to the flange in a direction perpendicular to a longitudinal axis of the connector, and wherein a volume of the chamber is configured to vary based on movement of the end of the elastic part in the direction perpendicular to the longitudinal axis of the connector.

6. The quick connector hose assembly of claim 1, wherein the housing comprises:
- a first portion in contact with the body;
- a second portion located at an end of the housing;
- a seating portion located between the first portion and the second portion; and
- a holder coupled to the seating portion, and wherein the seating portion defines a plurality of coupling holes at a lower end thereof, the plurality of coupling holes being configured to receive at least a part of the holder.

7. The quick connector hose assembly of claim 6, wherein the holder comprises:
- a first locking part that surrounds an upper end of the seating portion; and
- a plurality of second locking parts that extend from the first locking part along inner surfaces of the first portion and the second portion, the plurality of second locking parts being configured to respectively insert into the plurality of coupling holes.

8. The quick connector hose assembly of claim 7, wherein the housing further comprises an unlocking guide located adjacent to the plurality of coupling holes, and wherein the plurality of second locking parts are configured to move along the unlocking guide.

9. The quick connector hose assembly of claim 8, wherein the first locking part is configured to, based on external force being applied to the first locking part, move toward the seating portion, and wherein the plurality of second locking parts are configured to, based on the first locking part moving toward the seating portion, move along the unlocking guide to thereby be unlocked from the housing.

10. The quick connector hose assembly of claim 7, further comprising a nipple inserted into the housing, the nipple comprising an inclined surface having an outer diameter increasing in a direction away from the housing, wherein the nipple is inserted into the housing and configured to cause the plurality of second locking parts to move away from each other toward opposite ends of the housing along the inclined surface.

11. The quick connector hose assembly of claim 1, wherein the connector defines the communication hole at an outer circumferential surface thereof, and wherein the chamber extends from an inside of the connector to the communication hole.

12. The quick connector hose assembly of claim 1, wherein the elastic part is configured to radially expand to detach from the connector based on the pressure of the flow of fluid through the hose being applied to the inner surface of the elastic part to thereby selectively open the communication hole.

13. The quick connector hose assembly of claim 1, wherein the elastic part is configured to radially bend to detach from the connector based on the pressure of the flow of fluid through the hose being applied to the inner surface of the elastic part to thereby selectively open the communication hole.

14. A quick connector hose assembly comprising:

a hose;

a body having a first end connected to the hose;

a connector located in the body and fluidly connected to the hose;

a valve coupled to the connector, wherein a communication hole is defined between the valve and the connector; and a housing coupled to the valve and the connector, wherein the valve comprises:

a flange in contact with the connector, and an elastic part that extends from the flange in a longitudinal direction of the connector, the elastic part being configured to surround and cover a chamber that is defined between the communication hole and the elastic part, wherein the housing comprises:

a stepped part in contact with at least a part of the flange, and an extension part disposed adjacent to the stepped part and coupled to the connector, and wherein an end of the elastic part is configured to detach from and attach to the connector based on a flow of fluid through the hose to thereby selectively open and close the communication hole.

15. A quick connector hose assembly comprising:

a hose;

a body having a first end connected to the hose;

a connector located in the body and fluidly connected to the hose;

a valve coupled to the connector, wherein a communication hole is defined between the valve and the connector; and a housing coupled to the valve and the connector, wherein the valve comprises:

a flange in contact with the connector, and an elastic part that extends from the flange in a longitudinal direction of the connector, the elastic part being configured to surround and cover a chamber that is defined between the communication hole and the elastic part, wherein an end of the elastic part is configured to detach from and attach to the connector based on a flow of fluid through the hose to thereby selectively open and close the communication hole, wherein the communication hole is defined at an outer surface of the connector and faces an inner surface of the elastic part, and wherein the end of the elastic part is configured to, based on the fluid being introduced toward the communication hole, move toward the housing relative to the flange to thereby open the communication hole.

* * * * *